United States Patent
Cho et al.

(10) Patent No.: US 9,313,413 B2
(45) Date of Patent: Apr. 12, 2016

(54) IMAGE PROCESSING METHOD FOR IMPROVING IMAGE QUALITY AND IMAGE PROCESSING DEVICE THEREWITH

(71) Applicant: Samsung Electronics Co., Ltd., Suwon-Si, Gyeonggi-Do (KR)

(72) Inventors: Sung Kwang Cho, Seoul (KR); Taechan Kim, Yongin-si (KR); Wonho Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 180 days.

(21) Appl. No.: 14/246,626

(22) Filed: Apr. 7, 2014

(65) Prior Publication Data

US 2015/0015740 A1    Jan. 15, 2015

(30) Foreign Application Priority Data

Jul. 10, 2013    (KR) .................. 10-2013-0081108

(51) Int. Cl.
    *H04N 5/235*    (2006.01)
(52) U.S. Cl.
    CPC ........... *H04N 5/2351* (2013.01); *H04N 5/2355* (2013.01)
(58) Field of Classification Search
    None
    See application file for complete search history.

(56) References Cited

U.S. PATENT DOCUMENTS

| 7,443,443 | B2 | 10/2008 | Raskar et al. |
| 7,457,477 | B2 | 11/2008 | Petschnigg et al. |
| 7,583,297 | B2 | 9/2009 | Yamada |
| 7,590,344 | B2 | 9/2009 | Petschnigg |
| 7,724,952 | B2 | 5/2010 | Shum et al. |
| 8,224,176 | B1 | 7/2012 | Pillman et al. |
| 2010/0007746 | A1 | 1/2010 | Lee |
| 2010/0278452 | A1 | 11/2010 | Sarkijarvi et al. |
| 2012/0206628 | A1 | 8/2012 | Majewicz et al. |

FOREIGN PATENT DOCUMENTS

| JP | 2010-511340 A | 4/2010 |
| JP | 2011-035556 A | 2/2011 |
| KR | 2010-0096494 A | 9/2010 |
| KR | 2012-0064401 A | 6/2012 |

OTHER PUBLICATIONS

Gaubatz et al., "Automatic red-eye detection and correction," in IEEE Int. Conf. on Image Processing, 2002.

(Continued)

*Primary Examiner* — Twyler Haskins
*Assistant Examiner* — Angel L Garces-Rivera
(74) *Attorney, Agent, or Firm* — Harness, Dickey & Pierce (57) ABSTRACT

An image processing method includes adjusting a brightness of each of a first image and a second image based on a first exposure time when the first image is captured and a second exposure time when the second image is captured, respectively, the first and second images being generated by capturing a same object under different light conditions, estimating an intensity of light, reaching the object when the second image is captured, based on the adjusted brightness of each of the first and second images, separating the second image into two or more regions according to the estimated intensity of light, determining a target brightness that a final result image is to have, adjusting the brightness of the second image, by different amounts for each of the separated regions, based on the target brightness and generate the final result image based on the adjusted brightness of the second image.

20 Claims, 6 Drawing Sheets

(56) References Cited

OTHER PUBLICATIONS

Hoppe et al., "Continuous flash," Technical Report MSRTR-2003-63, Microsoft Corporation, Oct. 2003.

Krishnan et al., "Dark flash photography," in ACM Trans. Graphics, pp. 1-11, 2009.

Petschnigg et al., "Digital photography with flash and no-flash image pairs," in ACM Trans. on Graphics, 2004.

Eisemann et al., "Flash photography enhancement via intrinsic relighting," in ACM Trans. on Graphics, vol. 23, Issue 3, Aug. 2004.

Akers et al., "Conveying shape and features with image-based relighting," 14th IEEE Visualization 2003.

Raskar et al., "Non-photorealistic Camera:Depth Edge Detection and Stylized Rendering using Multi-Flash Imaging", in ACM (TOG), vol. 23, Issue 3, Aug. 2004.

Durand et al., "Fast bilateral filtering for the display of highdynamic-range images," ACM Trans. on Graphics, vol. 21, 2002.

IMAGE PROCESSING METHOD FOR IMPROVING IMAGE QUALITY AND IMAGE PROCESSING DEVICE THEREWITH

CROSS-REFERENCE TO RELATED APPLICATIONS

A claim for priority under 35 U.S.C. §119 is made to Korean Patent Application No. 10-2013-0081108 filed Jul. 10, 2013, in the Korean Intellectual Property Office, the entire contents of which are hereby incorporated by reference.

BACKGROUND

1. Technical Field

The inventive concepts described herein relate to image processing, and more particularly, relate to an image processing method capable of providing an image with improved image quality by using two images obtained by capturing the same object under different light conditions and an image processing device using the above image processing method.

2. Discussion of Related Art

A digital camera includes an image sensor to generate an electronic image. Common image sensors may include a Charge Coupled Device (CCD) image sensor, a CMOS Image Sensor (CIS), and so on. An image sensor includes pixels arranged in a two-dimension array. Each pixel included in the image sensor is formed of a red, green or blue filter.

The image sensor receives light during particular time to obtain an appropriate image signal. The time for receiving the light is referred to as exposure time. To obtain an image having appropriate brightness and high signal-to-noise ratio (SNR), the exposure time is adjusted based on brightness of environment where an image is captured. The digital camera has such an automatic exposure adjustment function for automatically adjusting the exposure time according to brightness of the environment where an image is captured.

A problem arises when an image is captured in an environment where the light is insufficient. An image captured in such environment where the light is insufficient does not represent the object appropriately. In general, to solve such a problem, a flash emitting artificial light is used. It is possible to capture an image with sufficient brightness by emitting the light around the object through the flash. When the flash is used, the image sensor receives sufficient light during short exposure time. In this case, since the SNR becomes higher, an image with fine expression is captured.

However, undesirable effects arise when the flash is used. For example, such undesirable effects may include a red-eye effect, breaking of color balance, and so on. Furthermore, an object near the flash is excessively exposed by the light, while an object distant from the flash is scarcely exposed by the light. That is, since a background of the image captured using the flash is dark and a foreground thereof is bright, the brightness of the image is unnatural. In particular, an LED flash embedded in a portable communication terminal has a low output power and emits the light irregularly. For this reason, use of the LED flash causes a decline in the quality of image.

SUMMARY

Some example embodiments of the inventive concepts is directed to provide an image processing methods and/or apparatuses for providing an image with improved image quality by using two images obtained by capturing the same object under different light conditions.

In one example embodiment, an image processing method includes adjusting a brightness of each of a first image and a second image based on a first exposure time when the first image is captured and a second exposure time when the second image is captured, respectively, the adjusted brightness of the first image corresponding to a brightness of the first image when the first image is captured over a unit exposure time, the adjusted brightness of the second image corresponding to a brightness of the second image when the second image is captured over the unit exposure time, the first and second images being generated by capturing a same object under different light conditions. The method further includes estimating an intensity of light, reaching the object when the second image is captured, based on the adjusted brightness of each of the first and second images, separating the second image into two or more regions according to the estimated intensity of light, determining a target brightness that a final result image is to have, adjusting the brightness of the second image, by different amounts for each of the separated regions, based on the target brightness and generating the final result image based on the adjusted brightness of the second image.

In yet another example embodiment, wherein the first image is an image captured without using a flash and the second image is an image captured by using the flash.

In yet another example embodiment, the first and second images are sequentially captured.

In yet another example embodiment, the adjusting the brightness of each of the first image and the second image adjusts the brightness of the first image by dividing the brightness of the first image by the first exposure, and adjusting the brightness of each of the first image and the second image adjust the brightness of the second image by dividing the brightness of the second image by the second exposure time.

In yet another example embodiment, estimating the intensity of light includes determining a difference between the adjusted brightness of the first image and the adjusted brightness of the second image, determining a ratio of the determined difference to the adjusted brightness of the first image, the estimated intensity of light corresponding to the determined ratio.

In yet another example embodiment, the target brightness has a strongest intensity among the estimated intensity of light with respect to each pixel forming the second image or an average of the estimated intensities of light with respect to all pixels forming the second image.

In yet another example embodiment, the adjusting the brightness of the second image by different amounts for each of the separated regions, adjusts the brightness of the second image based on a level of light reflected by the object.

In yet another example embodiment, the level of light reflected by the object corresponds to a ratio of a brightness of each pixel forming the first image to a strongest brightness among the brightness of all pixels forming the first image.

In yet another example embodiment, the image processing method further includes overlaying color information of a region of the first image corresponding to a darkness region in the second image, onto the darkness region, the darkness region being a region having color information that is less than a threshold.

In one example embodiment, an image processing device includes an image sensing circuit configured to receive light reflected from a same object under different light conditions to generate a first image signal and a second image signal. The image processing device further includes an image processing logic configured to generate a final result image by generating a first image and a second image based on the first image signal and the second image signal, respectively, adjusting a brightness of each of the first image and the second image based on a first exposure time when the first image is generated and a second exposure time when the second image is generated, respectively, the adjusted brightness of the first image corresponding to a brightness of the first image when the first image signal is received over a unit exposure time, the adjusted brightness of the second image corresponding to a brightness of the second image when the second image signal is received over the unit exposure time. The image processing logic is further configured to generate a final result image by estimating an intensity of light which reaches the object when the second image is generated based on the adjusted brightness of each of the first image and the second image, separating the second image into two or more regions according to the estimated intensity of light, determining a target brightness that the final result image is to have, and adjusting the brightness of the second image, by different amounts for each of the separated regions, based on the target brightness.

In yet another example embodiment, the first image signal is generated under a light condition where a flash is not used and the second image signal is generated under a light condition where the flash is used.

In yet another example embodiment, the image processing logic is further configured to determine a difference between the adjusted brightness of the first image and the adjusted brightness of the second image, determine a ratio of the determined difference to the adjusted brightness of the first image, and estimate the intensity of light, reaching the object when the second image signal is generated, based on the determined ratio.

In yet another example embodiment, the image processing logic is further configured to overlay color information of a region of the first image corresponding to a darkness region in the second image, into the darkness region, the darkness region being a region having color information that is less than a threshold.

In one example embodiment, an image processing system includes an image sensor configured to receive light reflected from a same object under different light conditions to generate a first image signal and a second image signal. The image processing system further includes an image processor configured to generate a final result image by generating a first image and a second image based on the first image signal and the second image signal, respectively, adjusting a brightness of each of the first image and the second image based on a first exposure time when the first image is generated and a second exposure time when the second image is generated, respectively, the adjusted brightness of the first image corresponding to a brightness of the first image when the first image signal is received over a unit exposure time, the adjusted brightness of the second image corresponding to a brightness of the second image when the second image signal is received over the unit exposure time, The image processor is configured to generate a final result image by estimating an intensity of light which reaches the object when the second image is generated based on the adjusted brightness of each of the first and second images, separating the second image into two or more regions according to the estimated intensity of light, determining a target brightness that the final result image is to have, and adjusting the brightness of the second image, by different amounts for each of the separated regions, based on the target brightness.

In yet another example embodiment, the first image signal is generated under a light condition where a flash is not used and the second image signal is generated under a light condition where the flash is used.

In one example embodiment, a method includes normalizing a first brightness of a first image of an object and a second brightness of a second image of the object captured under different light conditions, estimating an intensity of light reaching the object in the second image based on the normalized first brightness and the normalized second brightness and determining at least a first region and a second region in the second image based on the estimated intensity of light. The method further includes adjusting at least one of a third brightness of the first region and a fourth brightness of the second region based on a target brightness of a final image, and generating the final image based on at least the adjusted third brightness and the adjusted fourth brightness.

In yet another example embodiment, the normalizing normalizes the first brightness based on a first exposure time when the first image is captured and the normalizing normalizes the second brightness based on a second exposure time when the second image is captured.

In yet another example embodiment, the normalizing normalizes the first brightness by dividing the first brightness by the first exposure time, and the normalizing normalizes the second brightness by dividing the second brightness by the second exposure time.

In yet another example embodiment, the method further includes determining a difference between the normalized first brightness and the normalized second brightness and determining a ratio of the determined difference to the normalized first brightness, wherein the estimating estimates the intensity of light reaching the object in the second image based on the determined ratio.

In yet another example embodiment, the determining determines the target brightness as one of the normalized first brightness, the normalized second brightness, and an average of the normalized first brightness and the normalized second brightness.

In yet another example embodiment, the method further includes capturing the first image of the object under one of the different light conditions and the second image under another one of the different light conditions.

In yet another example embodiment, the one of the different light conditions corresponds to when an image sensor captures the first image without a flash, and the other one of the different light conditions corresponds to when the image sensor captures the second image with the flash.

In yet another example embodiment, the capturing captures the first and second images, sequentially.

In yet another example embodiment, the adjusting adjusts the at least one of the third brightness and the fourth brightness by increasing the at least one of the third brightness and the fourth brightness if the at least one of the third brightness and the fourth brightness is less than the target brightness and decreasing the at least one of the third brightness and the fourth brightness if the at least one of the third brightness and the fourth brightness is greater than the target brightness.

In yet another example embodiment, the method further includes overlaying color information of a region of the first image corresponding to a darkness region in the second image, onto the darkness region, the darkness region being a region having color information that is less than a threshold.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Example embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first" and "second" may be used herein to describe various elements and/or components, these elements and/or components should not be limited by these terms. These terms are only used to distinguish one element or component from another element or component. Thus, a first element or component discussed below could be termed a second element or component without departing from the teachings of the inventive concepts.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
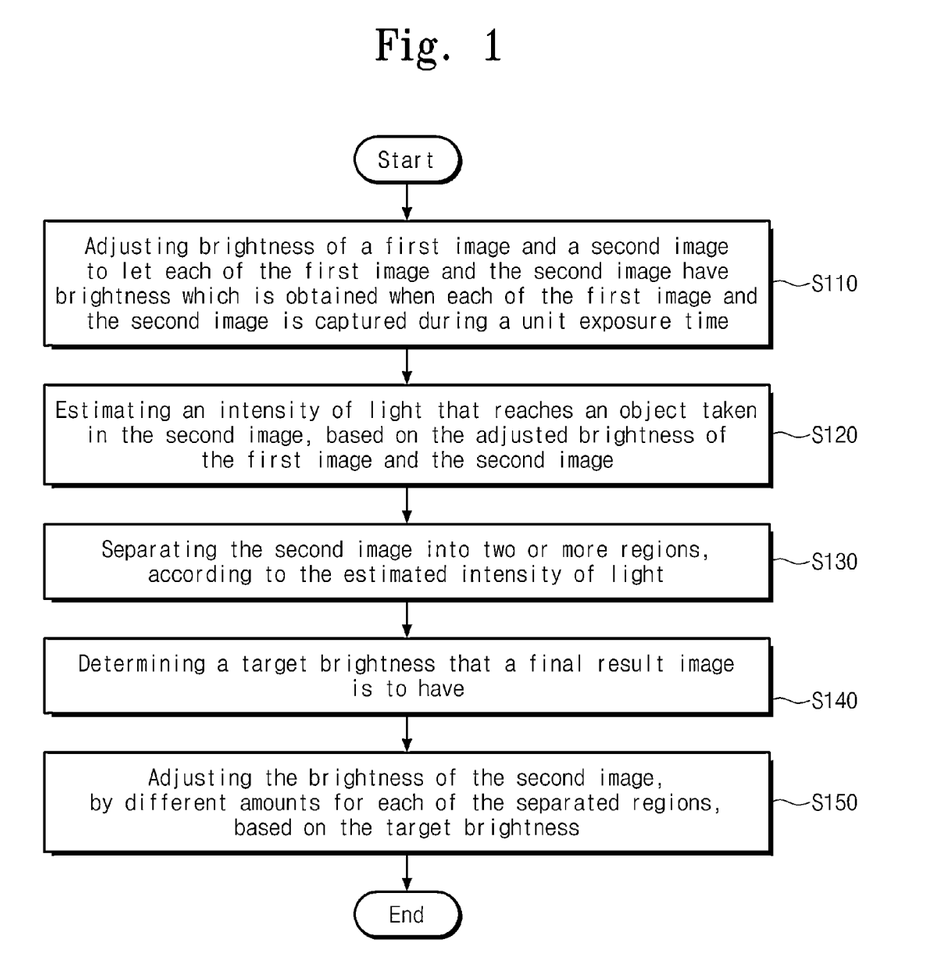
FIG. 1 is a flow chart for describing an image processing method according to an example embodiment of the inventive concepts.

FIG. 1 is a flow chart for describing an image processing method according to an example embodiment of the inventive concepts;

In step S110, brightness of each of a first image and a second image, obtained by capturing the same object under different light conditions, is adjusted. For instance, the first image may be an image captured without using a flash, and the second image may be an image captured by using the flash. The first and second images may be obtained by capturing the same object sequentially. That is, the first image is captured without using the flash, and then the second image may be captured by using the flash immediately.

It is assumed that the first image is an image captured without using the flash and the second image is an image captured by using the flash. This assumption is to help in understanding the inventive concepts and is not intended to limit the inventive concepts. The first and second images may be any images obtained by capturing the same object under different light conditions.

Since the first and second images are captured under different light conditions, they may be captured during different exposure times. When an image is captured in environment where light is insufficient, long exposure time is required to obtain the light sufficiently. In exemplary embodiments, brightness of each of the first and second images is adjusted so that each of the first and second images has a brightness corresponding to a unit exposure time during which each of the first and second images is captured. For example, a brightness of each of the first and second images is adjusted according to an exposure time when the first image is captured and an exposure time when the second image is captured, respectively. Such adjustment may be the same as normalizing the first and second images as if each of the first and second images is captured over the unit exposure time.

In exemplary embodiments, brightness of each of the first and second images is adjusted according to the following equations (1) and (2).

$$I_{o,norm} = \frac{I_o}{e_o} \quad (1)$$

$$I_{f,norm} = \frac{I_f}{e_f} \quad (2)$$

In equations (1) and (2), '$I_o$' and '$I_f$' indicate the brightness of the first image and the brightness of the second image, respectively. '$e_o$' and '$e_f$' indicate the exposure time when the first image is captured and the exposure time when the second image is captured, respectively. '$I_{o,norm}$' and '$I_{f,norm}$' indicate the adjusted brightness of the first image and the adjusted brightness of the second image, respectively. That is, the adjusted brightness of the first image has a value obtained by dividing the brightness of the first image by the exposure time when the first image is captured. Likewise, the adjusted brightness of the second image has a value obtained by dividing the brightness of the second image by the exposure time when the second image is captured. In general, an exposure time when an image is captured is automatically determined by a digital camera device. However, the exposure time may be arbitrarily adjusted by a user.

If the first image is captured without using a flash, the first image may be captured during a long exposure time so as to obtain sufficient light. If the second image is an image captured by using the flash, the second image may be captured during a short exposure time. Brightness corresponding to each of the first and second images is captured during a unit exposure time is obtained by dividing brightness of each of the first and second images by the exposure time of each of the first and second images, respectively. Brightness of each of the first and second images is adjusted to have a brightness obtained by a corresponding one of the equations (1) and (2).

Computation of equations (1) and (2) may be carried out with respect to each pixel of an image. Below, it is assumed that computation of equations is performed by a pixel unit. However, computations according to equations to be described below may be performed every desired (or, alternatively predetermined) area or every layer forming an image. Therefore, the above assumption is to help in understanding the inventive concepts and is not intended to limit the inventive concepts.

In step S120, an intensity of light, which reaches an object when the second image is captured, is estimated. The intensity of light which reaches the object when the second image is captured is estimated based on the adjusted brightness of each of the first and second images. For example, if the first image is captured without using a flash and the second image is captured by using the flash, the intensity of light which reaches the object is estimated by using the following equation (3).

$$Q_f = \frac{I_{f,norm} - I_{o,norm}}{I_{o,norm}} \quad (3)$$

In equation (3), '$Q_f$' designates the estimated intensity of light which reaches the object when the second image is captured. The numerator of equation (3) designates a difference between the adjusted brightness of the first image and the adjusted brightness of the second image. An intensity of light artificially emitted from a flash is obtained by subtracting the brightness of the first image captured without using the flash from the brightness of the second image captured by using the flash.

However, the numerator of equation (3) is affected by a reflection factor of the object. Thus, it is difficult to properly estimate the intensity of light reaching the object only using the numerator of equation (3). To address this issue, the adjusted brightness of the first image is applied to a denominator of equation (3). The intensity of light, reaching the object when the second image is captured, is indirectly estimated by determining a ratio of the difference between the adjusted brightness of the first image and the adjusted brightness of the second image to the adjusted brightness of the first image.

In step S130, the second image is separated into two or more regions. The second image is separated according to the estimated light intensity obtained in step S120. The second image may be divided into a region that is estimated as such that the intensity of light reaching the object is lower than a desired (or, alternatively predetermined) reference and a region that is estimated such that the intensity of light reaching the object is higher than the desired (or, alternatively predetermined) reference. Alternatively, two or more intervals may be set with respect to values of the intensities of light reaching the object, and then the second image is separated into two or more regions such that the values of the intensity of light corresponding to each of the separated regions belong to each of the intervals. Separating the second image into two or more regions according to the estimated light intensity may be changed as necessary.

The intensity of light reaching an object placed at a long distance from a camera is weak, while the intensity of light reaching an object placed at a short distance from a camera is strong. That is, separating the second image into two or more regions according to the estimated light intensity means separating the second image into two or more regions according to a distance between an object and a camera.

In step S140, target brightness that a final result image will have is determined. The target brightness may be determined to have the same value as the brightness of the first or second image. For example, the target brightness is determined to have a value corresponding to the strongest intensity among the estimated intensities of light with respect to each of pixels forming the second image.

Alternatively, the target brightness may be determined to be different from the brightness of the first and second images. For example, the target brightness is determined to have a value corresponding to an average of the estimated intensities of light with respect to all the pixels forming the second image. The target brightness is differently determined as necessary. A way of determining the target brightness is not limited to the above disclosure.

In step S150, the brightness of the second image is adjusted. The brightness of the second image is adjusted by different amounts for each of the separated regions obtained in step S130, based on the target brightness determined in step S140. Brightness of a region, having brightness weaker than the target brightness, among the separated regions of the second image is adjusted to be increased up to the target brightness. Also, brightness of a region, having brightness stronger than the target brightness, among the separated regions of the second image is adjusted to be decreased down to the target brightness.

If the second image is captured by using a flash, the brightness of the second image is irregular due to the distance between the flash and the object. With the above-described image processing method, a final result image having regular brightness is obtained by adjusting the brightness of the second image by different amounts for each of the separated regions.

Brightness of pixels forming one separated regions may be adjusted by the same amount based on the target brightness. However, a level of adjusting the brightness of the second image may be determined according to a level of light reflected by the object. That is, the brightness of the second image is adjusted according to the target brightness determined in step S140 and the level of light reflected by the object. A final result image having improved quality is obtained by applying a reflection factor to the level by which the brightness of the second image is adjusted.

The level of light reflected by the object may correspond to a ratio of the brightness of each of pixels forming the first image to the strongest brightness among the brightness of all the pixels forming the first image. The level of light reflected by the object is expressed by the following equation (4).

$$\frac{I_{o,norm}}{\max\{I_{o,norm}\}} \quad (4)$$

The ratio of brightness of one of pixels forming the first image to the strongest brightness among the brightness of all the pixels forming the first image is viewed as a level of light reflected by the object with respect to the one pixel. Noise may affect the final result image when information of the first image is used to obtain the level of light reflected by the object. A bilateral filter may be adapted to the adjusted brightness of the first image for reducing effect of the noise.

The brightness of the second image is adjusted according to a value obtained by the following equation (5) to which a ratio of equation (4) is reflected.

$$C_{offset} = (T_f - Q_f) \times \frac{I_{o,norm}}{\max\{I_{o,norm}\}} \quad (5)$$

In equation (5), '$C_{offset}$' designates a level by which the brightness of the second image is adjusted, and '$T_f$' designates the target brightness. According to equation (5), the level by which the brightness of the second image is adjusted is calculated by using the estimated intensity of light reaching the object when the second image is captured and the level of light reflected by the object. As described above, the target brightness may be differently determined as necessary.

In equation (5), '$(T_f-Q_f)$' designates a variation of brightness for enabling brightness of light before reflected by the object to have the target brightness. Using equation (5), a variation of brightness of light before being reflected by the object is converted into a variation of brightness of light after being reflected by the object. The converted result corresponds to the level by which the brightness of the second image is to be adjusted, that is, '$C_{offset}$'. The adjusted brightness of the second image is obtained by the following equation (6), based on the level by which the brightness of the second image is to be adjusted.

$$I'_{f,norm} = I_{f,norm} + F\{C_{offset}\} \times K \quad (6)$$

In equation (6), '$I_{f,norm}$' designates the adjusted brightness of the second image. '$F\{C_{offset}\}$' designates that a bilateral filter is applied to '$C_{offset}$'. 'K' is a constant having a value between 0 and 1. As understood from equation (5), since '$C_{offset}$' is obtained by using information of the first image, '$C_{offset}$' is affected by noise. As a bilateral filter is applied to '$C_{offset}$', sharpness of an image is maintained and effect of the noise is minimized.

Using equation (6), the level by which the brightness of the second image is adjusted is changed according to the constant 'K' having a value between 0 and 1. The brightness of the second image may be adjusted by different amounts for each of the separated regions, by applying different 'K' values to each region separated in step S130 as necessary. Equations (5) and (6) of the inventive concepts are only exemplary. It is possible to calculate the level by which the brightness of the second image is to be adjusted and the adjusted brightness of the second image by other various means.

Figure 2:
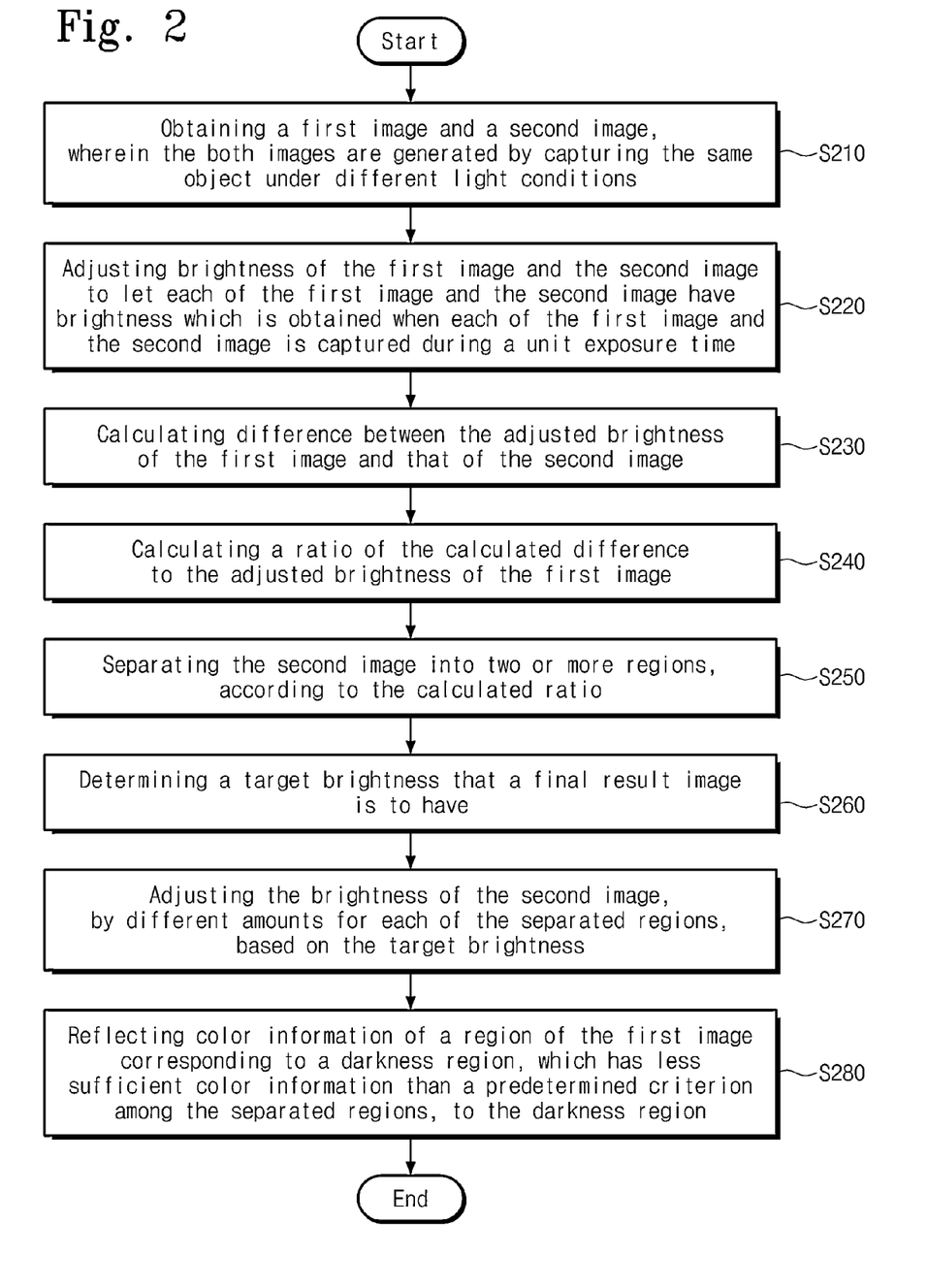
FIG. 2 is a flow chart for describing an image processing method according to an example embodiment of the inventive concepts.

FIG. 2 is a flow chart for describing an image processing method according to an example embodiment of the inventive concepts.

In step S210, a first image and a second image are obtained. The first and second images may be obtained by capturing the same object under different light conditions. The first and second images may be images that are captured in advance and stored in a memory (not shown). Alternatively, the first and second images may be images captured by a user after an image processing method according to an example embodiment of the inventive concepts commences. For instance, the first image is captured without using a flash, while the second image is captured by using the flash. In exemplary embodiments, the first and second images may be obtained by capturing the same object sequentially.

In step S220, brightness of the first and second images is adjusted (e.g., normalized, as described above). Processes performed in step S220 may be the same as that performed in step S110, and a description thereof is thus omitted.

In step S230, a difference between the adjusted brightness of the first image and the adjusted brightness of the second image is calculated. For example, an intensity of light artificially emitted from a flash is obtained by subtracting the brightness of the first image captured without using the flash from the brightness of the second image captured using the flash. However, the difference between the adjusted brightness of the first image and the adjusted brightness of the second image is affected by a reflection factor of the object as described with reference to equation (3). Step S240 is performed to supplement the above problem.

In step S240, a ratio of the difference between the adjusted brightness of the first image and the adjusted brightness of the second image to the adjusted brightness of the first image, is calculated. The calculated ratio is viewed as an estimated value of an intensity of light reaching the object when the second image is captured, as described with reference to equation (3). That is, in steps S230 and S240, the intensity of light reaching the object when the second image is captured is estimated.

In step S250, the second image is separated into two or more regions. The second image is separated according to the ratio calculated in step S240. Processes performed in step S250 may be the same as that performed in step S130, and a description thereof is thus omitted.

In step S260, target brightness that a final result image will have is determined. Processes performed in step S260 may include processes performed in step S140, and a description thereof is thus omitted.

In step S270, the brightness of the second image is adjusted. The brightness of the second image is adjusted by different amounts for each of the separated regions obtained in step S250, based on the target brightness determined in step S260. A level of light reflected by the object is applied to a level by which the brightness of the second image is to be adjusted. The light reflected by the object is described above with reference to equations (4) and (5). Processes performed in step S270 may be the same as that performed in step S150, and a description thereof is thus omitted.

In step S280, color information is added in a region having less sufficient color information than a desired (or, alternatively predetermined) criterion among the separated regions obtained in step S250. When an image is captured by using a flash, light does not sufficiently reach the object placed at a long distance. Thus, the second image captured by using the flash may include a region having less sufficient color information than the desired (or, alternatively predetermined) criterion due to low brightness. Such a region having less sufficient color information than the desired (or, alternatively predetermined) criterion is referred to as a "darkness region".

The darkness region has insufficient color information. Thus, although the brightness of the darkness region is adjusted in step S270, the image quality of the darkness region may not be improved sufficiently. To solve this problem, the first image captured without using the flash is used.

Color information of a region, corresponding to the darkness region of the second image, among the first image is reflected (e.g., superimposed/added/overlaid) to the darkness region of the second image.

Likelihood that the first image captured without using the flash has regular brightness and sufficient color information is high. Thus, the image quality of the second image is further improved by adding color information of a region, corresponding to the darkness region of the second image, among the first image to the darkness region of the second image. However, if color information of the first image is added to the second image, continuity of an image may be broken at a boundary between the separated regions. Such a problem is solved by applying a Gaussian filter to a boundary between the separated regions and peripheral pixels.

Figure 3:
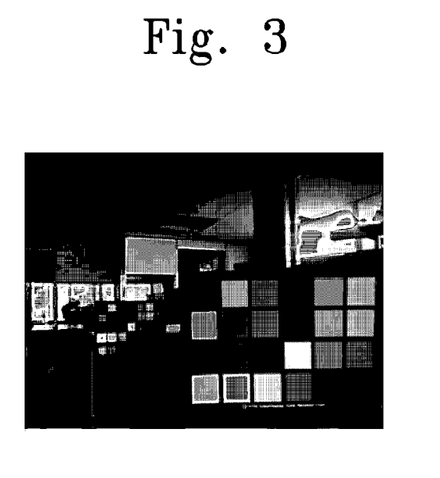
FIG. 3 is an exemplary image captured without using a flash.

FIG. 3 is an exemplary image captured without using a flash. An image shown in FIG. 3 is captured without using a flash and has regular brightness overall. However, since illumination of environment where an image is captured is low, the image shown in FIG. 3 provides unsharp objects.

Figure 4:
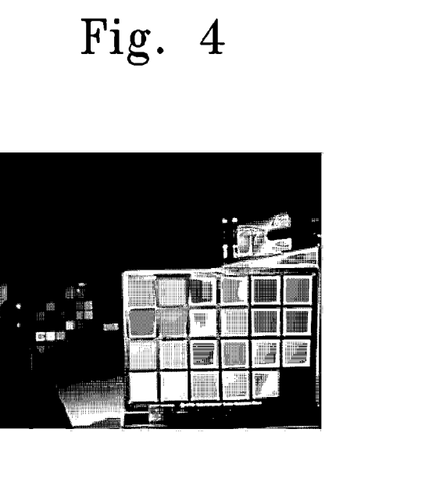
FIG. 4 is an exemplary image captured by using a flash.

FIG. 4 is an exemplary image captured by using a flash. An image shown in FIG. 4 sharply expresses objects placed at a short distance. However, some objects placed at a short distance are excessively exposed by light. Additionally, light does not reach objects placed at a long distance sufficiently. Thus, a region including objects placed at a long distance does not have sufficient color information.

Figure 5:
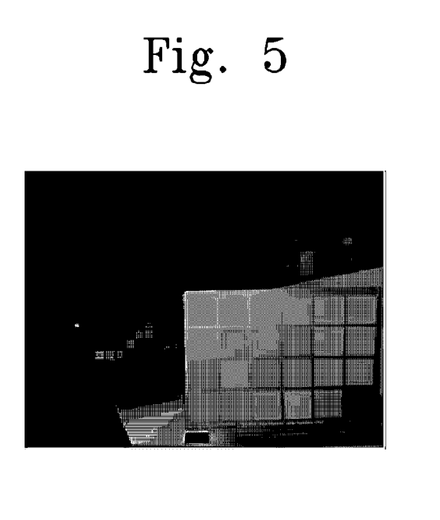
FIG. 5 is an exemplary image showing a result of estimated intensities of light, reaching an object, obtained by using an image processing method according to an example embodiment of the inventive concepts.

FIG. 5 is an exemplary image showing a result of estimated intensities of light, reaching an object, obtained by using an image processing method according to an example embodiment of the inventive concepts. An image shown in FIG. 5 indicates distribution of estimated intensities of light obtained in step S120 of FIG. 1 or in steps S230 and S240 of FIG. 2.

An image shown in FIG. 5 includes a region having a near black color and a region having a near gray color. A criterion to divide the region having a near black color and the region having a near gray color may be changed as necessary. The region having a near black color indicates that light does not sufficiently reach an object captured on the region. The region having a near gray color indicates that light sufficiently reaches an object captured on the region. For instance, in step S130 of FIG. 1 or in step S250 of FIG. 2, the second image is separated into the region having a near black color and the region having a near gray color.

Figure 6:
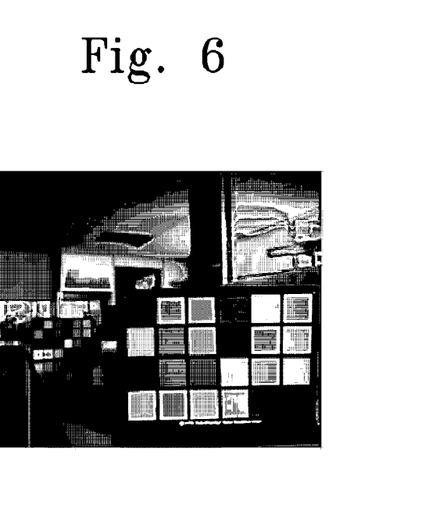
FIG. 6 is an exemplary final result image generated by using an image processing method according to an example embodiment of the inventive concepts.
Figure 7:
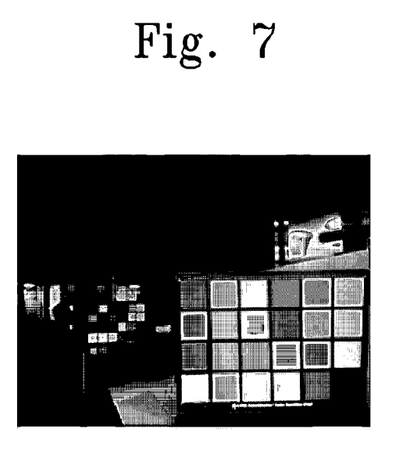
FIGS. 7 to 10 are other exemplary final result images generated by using an image processing method according to an example embodiment of the inventive concepts.

FIG. 6 is an exemplary final result image generated by using an image processing method according to an example embodiment of the inventive concepts. The final result image shown in FIG. 6 is obtained by setting target brightness to have the strongest intensity among intensities of light estimated in FIG. 5 and adjusting brightness of an image shown in FIG. 4 based on the determined target brightness.

However, in an image shown in FIG. 4, a region including a captured result of an object placed at a long distance does not have sufficient color information. For this reason, it is difficult to appropriately adjust brightness of the region including the captured result of an object placed at a long distance from the camera. Thus, color information with respect to an object placed at a long distance in an image shown in FIG. 3 needs to be added to an image shown in FIG. 4 according to step S280 of FIG. 2. The final result image shown in FIG. 6 is obtained by reflecting color information with respect to the object placed at a long distance in the image shown in FIG. 3.

The final result image shown in FIG. 6 has regular brightness overall and sharply expresses objects placed both at a long distance and at a short distance. That is, with an image processing method of the inventive concepts, an image having improved image quality is obtained from two images having captured the same object in different light conditions.

FIGS. 7 to 10 are other exemplary final result images generated by using an image processing method according to an example embodiment of the inventive concepts. Particularly, FIGS. 7 to 10 are images generated by setting a constant 'K' in an equation (6) to have different values with respect to each of the separated regions.

Figure 8:
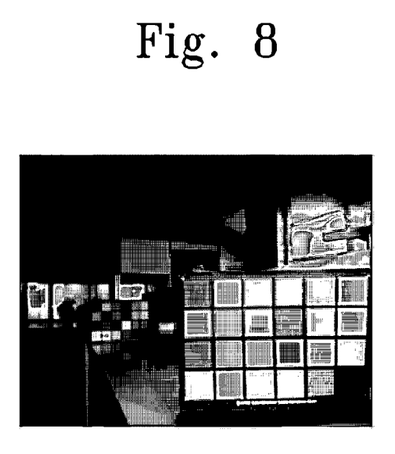
Figure 9:
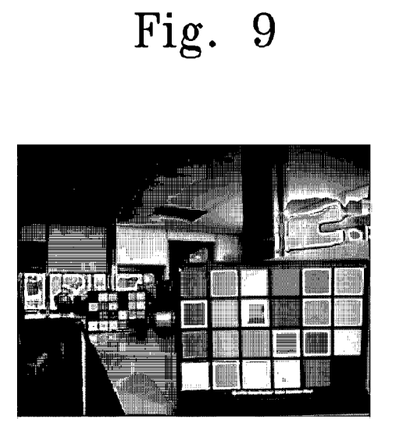
Figure 10:
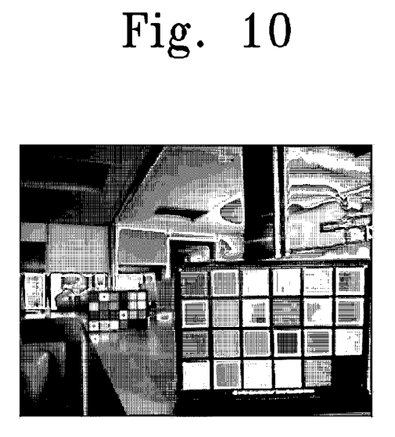

A constant 'K' is set to have a value '1' with respect to a region having a near gray color in an image shown in FIG. 5. Meanwhile, in FIG. 7, the constant 'K' is set to have a value '0.1' with respect to a region having a near black color in the image shown in FIG. 5. In FIG. 8, the constant 'K' is set to have a value '0.4' with respect to the region having a near black color in the image shown in FIG. 5. In FIG. 9, the constant 'K' is set to have a value '0.7' with respect to the region having a near black color in the image shown in FIG. 5. In FIG. 10, the constant 'K' is set to have a value '1' with respect to the region having a near black color in the image shown in FIG. 5. As understood from FIGS. 7 to 10, quality of an image is varied according to a value of the constant 'K' included in equation (6). Thus, an image having high quality is obtained by adjusting a value of the constant 'K' included in equation (6) according to the environment in which an image is captured.

Figure 11:
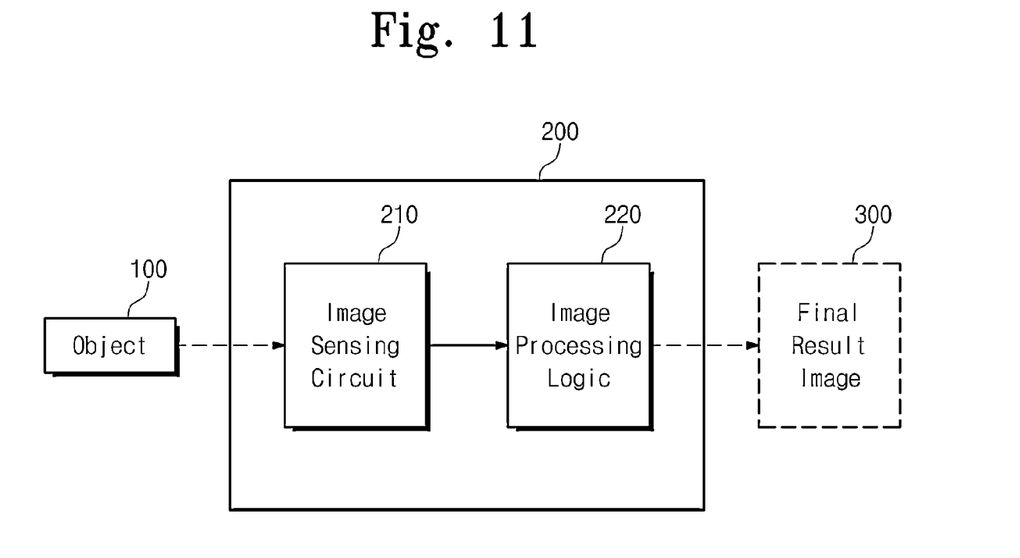
FIG. 11 is a block diagram illustrating an image processing device according to other embodiment of the inventive concepts.

FIG. 11 is a block diagram illustrating an image processing device according to an example embodiment of the inventive concepts. An image processing device 200 according to an example embodiment of the inventive concepts includes an image sensing circuit 210 and an image processing logic 220. The image processing device 200 captures an object 100 to generate a final result image 300.

The image sensing circuit 210 receives light reflected by the object 100 to generate an image signal. Particularly, the image sensing circuit 210 receives lights reflected by the same object 100 under different light conditions and generates a first image signal and a second image signal. For instance, the first image signal is generated under a light condition where a flash is not used, and the second image signal is generated under a light condition where the flash is used.

The image processing logic 220 generates a first image based on the first image signal. The image processing logic 220 generates a second image based on the second image signal.

The image processing logic 220 adjusts brightness of each of the first and second images. In exemplary embodiments, the image processing logic 220 adjusts the brightness of each of the first and second images so that each of the first and second images has brightness corresponding to an exposure time during which each of the first and second images is captured. For this, the image processing logic 220 reflects the exposure time when the first image is captured to the brightness of the first image. Also, the image processing logic 220 reflects exposure time when the second image is captured to the brightness of the second image.

The image processing logic 220 estimates an intensity of light, reaching the object 100 when the second image is captured, based on the adjusted brightness of each of the first and second images. For example, the image processing logic 220 calculates the difference between the adjusted brightness of the first image and the adjusted brightness of the second image. The image processing logic 220 calculates a ratio of the calculated difference to the adjusted brightness of the first image. The image processing logic 220 estimates the intensity of light, reaching the object 100 when the second image is captured, based on the calculated ratio.

The difference between the adjusted brightness of the first image and the adjusted brightness of the second image means an intensity of light artificially emitted from the flash. However, the difference between the adjusted brightness of the first image and the adjusted brightness of the second image is affected by a reflection factor of the object 100. A ratio of the difference between the adjusted brightness of the first image and the adjusted brightness of the second image to the adjusted brightness of the first image is calculated to estimate the intensity of light reaching the object 100 appropriately. The intensity of light emitted from the flash and reaching the object 100 when the second image is captured is indirectly estimated based on the calculated ratio.

The image processing logic 220 separates the second image into two or more regions according to the estimated light intensity. A way of separating the second image into two or more regions according to the estimated light intensity may be as described above and/or be changed as necessary. The image processing logic 220 determines a target brightness that the final result image will have. The target brightness may be determined as described above.

The image processing logic 220 adjusts the brightness of the second image, by different amounts for each of the separated regions, based on the determined target brightness. If the second image is captured by using a flash, the brightness of the second image is irregular according to distance between the flash and the object 100. The image processing logic 220 generate the final result image 300 having regular brightness overall by adjusting the brightness of the second image by different amounts for each of the separated regions.

The image processing logic 220, for instance, adds color information to a region having less sufficient color information than a desired (or, alternatively predetermined) criterion among the separated regions. When an image is captured by using a flash, light does not sufficiently reach the object 100 placed at a long distance from the camera. Thus, the second image captured by using the flash may include a region having less sufficient color information than the desired (or, alternatively predetermined) criterion due to low brightness. As mentioned above, such a region having less sufficient color information than the desired (or, alternatively predetermined) criterion is referred to as a "darkness region".

The darkness region has insufficient color information. Thus, although the image processing logic 220 adjusts brightness of the darkness region, the image quality of the darkness region may not be improved sufficiently. To solve this problem, the first image captured without using the flash is used. The image processing logic 220 reflects color information of a region, corresponding to the darkness region of the second image, among the first image to the darkness region of the second image.

With the image processing device 200 of the inventive concepts, the final result image 300 having improved quality is obtained from two images captured the same object 300 under different light conditions.

Figure 12:
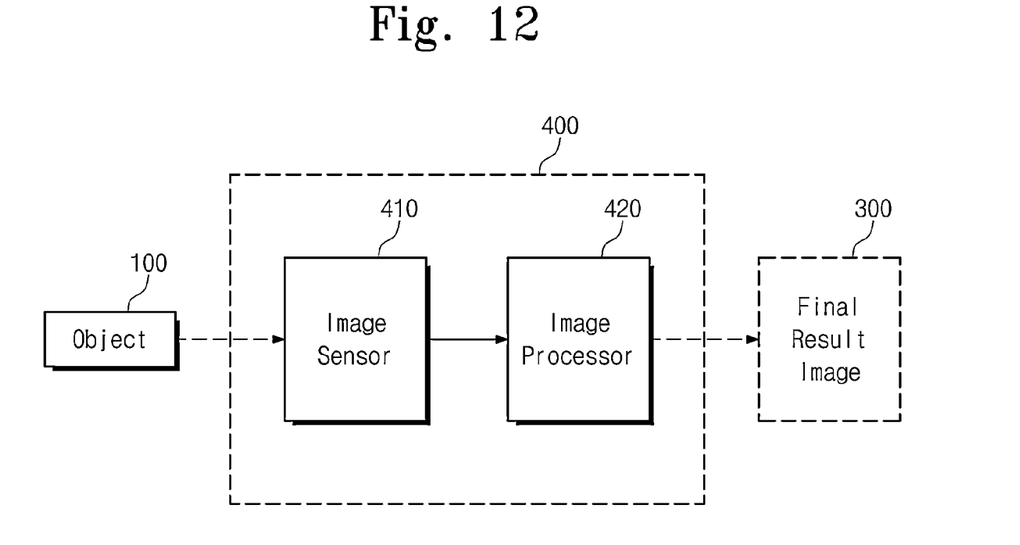
FIG. 12 is a block diagram illustrating an image processing system according to another embodiment of the inventive concepts.

FIG. 12 is a block diagram illustrating an image processing system according to an example embodiment of the inventive concepts. An image processing system 400 according to an example embodiment of the inventive concepts includes an image sensor 410 and an image processor 420. The image processing system 400 captures an object 100 to generate a final result image 300.

The image sensor 410 receives light reflected by the object 100 to generate an image signal. Particularly, the image sensor 410 receives lights reflected by the same object 100 under different light conditions and generates a first image signal and a second image signal. For instance, the first image signal is generated under a light condition where a flash is not used, and the second image signal is generated under a light condition where the flash is used.

The image processor 420 generates a first image based on the first image signal. The image processor 420 generates a second image based on the second image signal.

The image processor 420 adjusts brightness of each of the first and second images. In exemplary embodiments, the image processor 420 adjusts the brightness of each of the first and second images so that each of the first and second images has brightness corresponding to that each of the first and second images is captured during a unit exposure time. For this, the image processor 420 reflects exposure time when the first image is captured to the brightness of the first image. Also, the image processor 420 reflects the exposure time, when the second image is captured, to the brightness of the second image.

The image processor 420 estimates an intensity of light reaching the object 100 when the second image is captured, based on the adjusted brightness of each of the first and second images. For example, the image processor 420 calculates a difference between the adjusted brightness of the first image and the adjusted brightness of the second image. The image processor 420 calculates a ratio of the calculated difference to the adjusted brightness of the first image. The image processor 420 estimates the intensity of light reaching the object 100 when the second image is captured, based on the calculated ratio.

The difference between the adjusted brightness of the first image and the adjusted brightness of the second image means an intensity of light artificially emitted from the flash. However, the difference between the adjusted brightness of the first image and the adjusted brightness of the second image is affected by a reflection factor of the object 100. A ratio of the difference between the adjusted brightness of the first image and the adjusted brightness of the second image to the adjusted brightness of the first image is calculated to estimate the intensity of light reaching the object 100 appropriately. The intensity of light emitted from the flash and reaching the object 100 when the second image is captured is indirectly estimated based on the calculated ratio.

The image processor 420 separates the second image into two or more regions according to the estimated light intensity. Separating the second image into two or more regions according to the estimated light intensity may be done as described above. The image processor 420 determines a target brightness that the final result image will have, based on for example the method described above.

The image processor 420 adjusts the brightness of the second image, by different amounts for each of the separated regions, based on the determined target brightness. If the second image is captured by using a flash, the brightness of the second image is irregular according to distance between the flash and the object 100. The image processor 420 generates the final result image 300 having regular brightness overall by adjusting the brightness of the second image by different amounts for each of the separated regions.

With the image processing system 400 of the inventive concepts, the final result image 300 having improved quality is obtained from two images captured the same object 300 under different light conditions.

In an image processing device 200 shown in FIG. 11, an image sensing circuit 210 and image processing logic 220 are implemented in one integrated device. Meanwhile, in an image processing system 400 shown in FIG. 12, an image sensor 410 and an image processor 420 are implemented separately.

Figure 13:
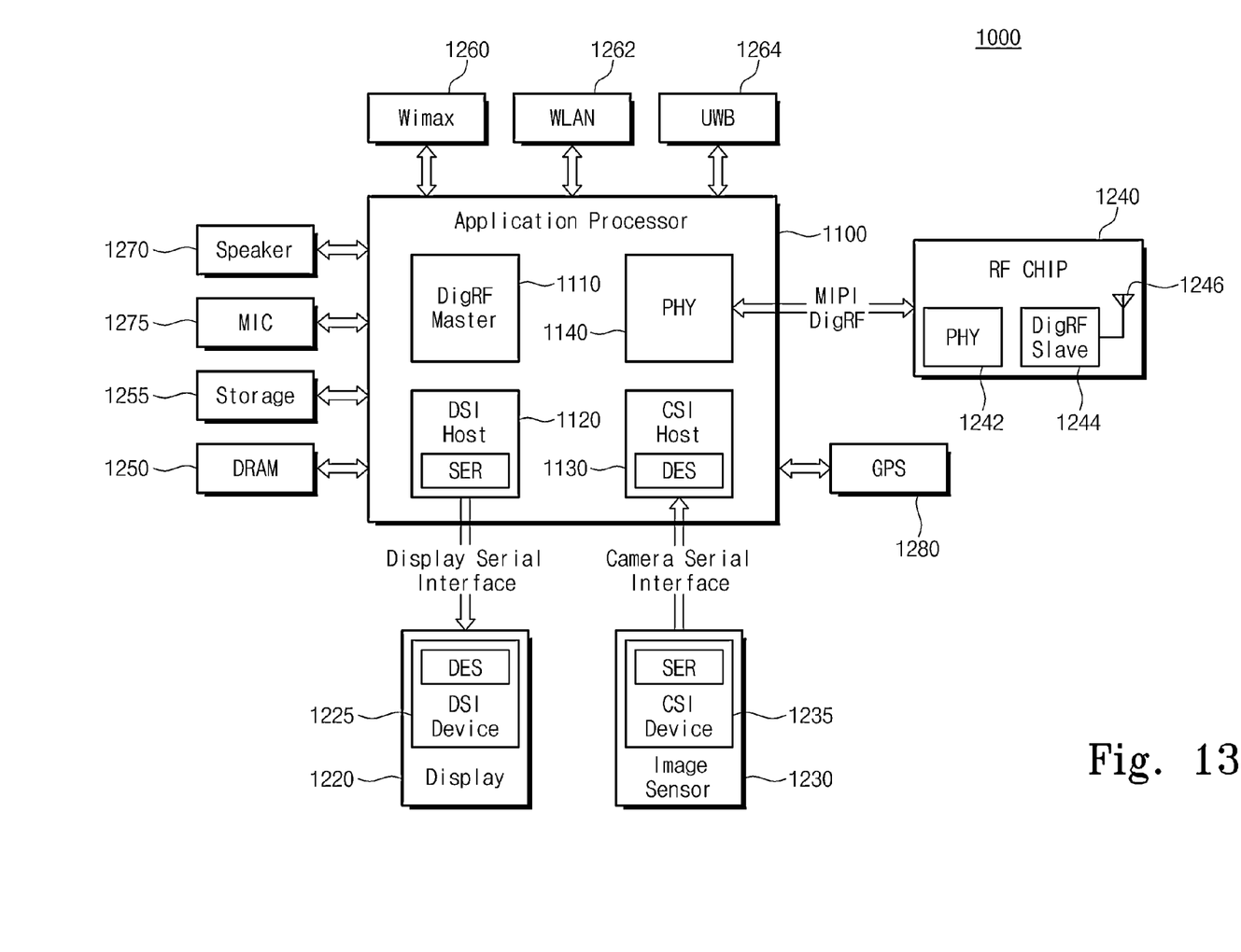
FIG. 13 is a block diagram illustrating an electronic system including an image processing system according to another embodiment of the inventive concepts and its interface.

FIG. 13 is a block diagram illustrating an electronic system including an image processing system according to an example embodiment of the inventive concepts and its interface. Referring to FIG. 13, an electronic system 1000 may be implemented by a data processing device (e.g., a cellular phone, a PDA, a PMP, or a smart phone) using or supporting an MIPI (Mobile Industry Processor Interface) interface.

The electronic system 1000 includes an application processor 1100, a display 1220, and an image sensor 1230. The application processor 1100 includes a DigRF master 1110, a DSI host 1120, a CSI host 1130, and PHY 1140.

The DSI host 1120 communicates with a DSI device 1225 of the display 1220 through DSI (Display Serial Interface). For example, an optical serializer SER is implemented in the DSI host 1120, and an optical de-serializer DES is implemented in the DSI device 1225.

The CSI host 1130 communicates with a CSI device 1235 of the image sensor 1230 through CSI (Camera Serial Interface). For example, an optical de-serializer DES is implemented in the CSI host 1130, and an optical serializer SER is implemented in the CSI device 1235.

The electronic device 1000 further comprises a Radio Frequency (RF) chip 1240 capable of performing communications with the application processor 1100. The RF chip 1240 includes PHY 1242, a DigRF slave 1244, and an antenna 1246. For example, data is exchanged between the PHY 1242 of the RF chip 1240 and the PHY 1140 of the application processor 1100 through MIPI DigRF.

The electronic system 1000 further comprises a DRAM 1250 and storage 1255. The DRAM 1250 and the storage 1255 store data provided from the application processor 1100. Also, the DRAM 1250 and the storage 1255 provide data stored therein to the application processor 1100.

For example, the electronic system 1000 communicates with an external system (not shown) using Wimax 1260, WLAN 1262, UWB 1264, and so on. Also, the electronic system 1000 further comprises a speaker 1270 and a microphone 1275 for processing of sound information. Furthermore, the electronic system 1000 comprises a GPS device 1280 for processing of position information.

While the inventive concepts has been described with reference to exemplary embodiments, it will be apparent to those skilled in the art that various changes and modifications may be made without departing from the spirit and scope of the present disclosure. Therefore, it should be understood that the above example embodiments are not limiting, but rather presented for illustrative purposes.

What is claimed is:

1. An image processing method comprising:
adjusting a brightness of each of a first image and a second image based on a first exposure time when the first image is captured and a second exposure time when the second image is captured, respectively, the adjusted brightness of the first image corresponding to a brightness of the first image when the first image is captured over a unit exposure time, the adjusted brightness of the second image corresponding to a brightness of the second image when the second image is captured over the unit exposure time, the first and second images being generated by capturing a same object under different light conditions;
estimating an intensity of light, reaching the object when the second image is captured, based on the adjusted brightness of each of the first and second images;
separating the second image into two or more regions according to the estimated intensity of light;
determining a target brightness that a final result image is to have;
adjusting the brightness of the second image, by different amounts for each of the separated regions, based on the target brightness; and
generating the final result image based on the adjusted brightness of the second image.

2. The image processing method of claim 1, wherein
the first image is an image captured without using a flash, and
the second image is an image captured by using the flash.

3. The image processing method of claim 2, wherein the first and second images are sequentially captured.

4. The image processing method of claim 1, wherein
the adjusting the brightness of each of the first image and the second image adjusts the brightness of the first image by dividing the brightness of the first image by the first exposure time, and
the adjusting the brightness of each of the first image and the second image adjusts the brightness of the second image by dividing the brightness of the second image by the second exposure time.

5. The image processing method of claim 1, wherein the estimating the intensity of light comprises:
determining a difference between the adjusted brightness of the first image and the adjusted brightness of the second image; and
determining a ratio of the determined difference to the adjusted brightness of the first image, the estimated intensity of light corresponding to the determined ratio.

6. The image processing method of claim 1, wherein the target brightness has a strongest intensity among the estimated intensities of light with respect to each pixel forming the second image or an average of the estimated intensities of light with respect to all pixels forming the second image.

7. The image processing method of claim 1, wherein the adjusting the brightness of the second image by different amount for each of the separated regions, adjusts the brightness of the second image based on a level of light reflected by the object.

8. The image processing method of claim 7, wherein the level of light reflected by the object corresponds to a ratio of a brightness of each pixel forming the first image to a strongest brightness among the brightness of all pixels forming the first image.

9. The image processing method of claim 1, further comprising:
overlaying color information of a region of the first image corresponding to a darkness region in the second image, on to the darkness region, the darkness region being a region having color information that is less than a threshold.

10. An image processing device comprising:
an image sensing circuit configured to receive light reflected from a same object under different light conditions to generate a first image signal and a second image signal; and
an image processing logic configured to generate a final result image by,
generating a first image and a second image based on the first image signal and the second image signal, respectively,
adjusting a brightness of each of the first image and the second image based on a first exposure time when the first image is generated and a second exposure time when the second image is generated, respectively, the adjusted brightness of the first image corresponding to a brightness of the first image when the first image signal is received over a unit exposure time, the adjusted brightness of the second image corresponding to a brightness of the second image when the second image signal is received over the unit exposure time;

estimating an intensity of light which reaches the object when the second image is generated based on the adjusted brightness of each of the first and second images, separating the second image into two or more regions according to the estimated intensity of light, determining a target brightness that the final result image is to have, and adjusting the brightness of the second image, by different amounts for each of the separated regions, based on the target brightness.

11. A method comprising:

normalizing a first brightness of a first image of an object and a second brightness of a second image of the object captured under different light conditions, estimating an intensity of light reaching the object in the second image based on the normalized first brightness and the normalized second brightness, determining at least a first region and a second region in the second image based on the estimated intensity of light, adjusting at least one of a third brightness of the first region and a fourth brightness of the second region based on a target brightness of a final image, and generating the final image based on at least the adjusted third brightness and the adjusted fourth brightness.

12. The method of claim 11, wherein the normalizing normalizes the first brightness based on a first exposure time when the first image is captured, and the normalizing normalizes the second brightness based on a second exposure time when the second image is captured.

13. The method of claim 12, wherein the normalizing normalizes the first brightness by dividing the first brightness by the first exposure time, and the normalizing normalizes the second brightness by dividing the second brightness by the second exposure time.

14. The method of claim 11, further comprising:

determining a difference between the normalized first brightness and the normalized second brightness; and determining a ratio of the determined difference to the normalized first brightness, wherein the estimating estimates the intensity of light reaching the object in the second image based on the determined ratio.

15. The method of claim 11, wherein the determining determines the target brightness as one of, the normalized first brightness, the normalized second brightness, and an average of the normalized first brightness and the normalized second brightness.

16. The method of claim 11, further comprising:

capturing the first image of the object under one of the different light conditions and the second image under another one of the different light conditions.

17. The method of claim 16, wherein the one of the different light conditions corresponds to when an image sensor captures the first image without a flash, and the other one of the different light conditions corresponds to when the image sensor captures the second image with the flash.

18. The method of claim 16, wherein the capturing captures the first and second images, sequentially.

19. The method of claim 11, wherein the adjusting adjusts the at least one of the third brightness and the fourth brightness by, increasing the at least one of the third brightness and the fourth brightness if the at least one of the third brightness and the fourth brightness is less than the target brightness, and decreasing the at least one of the third brightness and the fourth brightness if the at least one of the third brightness and the fourth brightness is greater than the target brightness.

20. The method of claim 11, further comprising:

overlaying color information of a region of the first image corresponding to a darkness region in the second image, onto the darkness region, the darkness region being a region having color information that is less than a threshold.

* * * * *